(12) United States Patent
Chuang

(10) Patent No.: US 7,059,622 B2
(45) Date of Patent: Jun. 13, 2006

(54) COLLAPSIBLE STAND FOR BICYCLE

(76) Inventor: Louis Chuang, 2F-2, No. 91, Section 4 Mei Chuan East Road, Pei Tun District, Taichung (TW)

( * ) Notice: Subject to any disclaimer, the term of this patent is extended or adjusted under 35 U.S.C. 154(b) by 0 days.

(21) Appl. No.: 10/885,334

(22) Filed: Jul. 6, 2004

(65) Prior Publication Data

US 2006/0061061 A1    Mar. 23, 2006

(51) Int. Cl.
    *B62H 7/00*    (2006.01)
(52) U.S. Cl. ..................................... 280/293
(58) Field of Classification Search ............... 280/293, 280/298, 301; 248/150, 166; 211/17
    See application file for complete search history.

(56) References Cited

U.S. PATENT DOCUMENTS

| | | | |
|---|---|---|---|
| 555,024 A * | 2/1896 | Ruffhead et al. ............ 280/301 |
| 611,672 A | 10/1898 | Beecher | |
| 948,349 A * | 2/1910 | Settle .......................... 280/298 |
| 3,712,637 A * | 1/1973 | Townsend ................... 280/293 |
| 3,712,640 A * | 1/1973 | Shipman et al. ............ 280/301 |
| 3,980,320 A * | 9/1976 | Marchello ................... 280/293 |
| 4,556,230 A * | 12/1985 | Diekman .................... 280/301 |
| 4,869,453 A * | 9/1989 | Newman ..................... 248/552 |

OTHER PUBLICATIONS

German Patent Publication No. DE 118737 C, Mar. 22, 1901, 3 pages.
German Patent Publication No. DE 77750 C, Oct. 29, 1894, 3 pages.
EPC Patent Publication No. EP 1081030 A2, Mar. 7, 2001, 10 pages.
Austrian Patent Publication No. AT 7593, May 10, 1902, 3 pages.
Switzerland Patent Publication No. CH 241563, Aug. 1, 1946, 3 pages.

* cited by examiner

Primary Examiner—Tony Winner
(74) Attorney, Agent, or Firm—Alan D. Kamrath; Nikolai & Mersereau, P.A.

(57) ABSTRACT

A collapsible stand for a bicycle includes a hooking element for hooking a down tube of the bicycle. An upper palming element is pivotally connected with the hooking element for palming a bottom bracket of the bicycle. A lower palming element is pivotally connected with the upper palming element for palming the bottom bracket. A telescopic device is connected with the lower palming element. Two legs are pivotally connected with the telescopic device for cooperating with the front wheel in order to form a three-point supporting situation.

18 Claims, 5 Drawing Sheets

COLLAPSIBLE STAND FOR BICYCLE

FIELD OF INVENTION

The present invention relates to a bicycle and, more particularly, to a collapsible stand for a bicycle.

BACKGROUND OF INVENTION

FIG. 5 shows a conventional stand 10 for a bicycle. The conventional stand 10 includes a palming portion 12, a hooking portion 14 extending upwards from the palming portion 12 and two legs 16 extending downwards from the palming portion 12. In use, the hooking portion 14 hooks the down tube of the bicycle. The palming portion 12 palms the bottom bracket of the bicycle. The legs 16 cooperate with the front wheel in order to provide three-point support. The stand 10 is non-collapsible. It occupies a certain space, in use or not. Hence, it is inconvenient for a rider to carry the stand 10.

The present invention is therefore intended to obviate or at least alleviate the problems encountered in the prior art.

SUMMARY OF INVENTION

The primary objective of the present invention is to provide a collapsible stand that is small in size and light in weight.

According to the present invention, a collapsible stand includes a hooking element for hooking a down tube of a bicycle. An upper palming element is pivotally connected with the hooking element for palming a bottom bracket of the bicycle. A lower palming element is pivotally connected with the upper palming element for palming the bottom bracket. A telescopic device is connected with the lower palming element. Two legs are pivotally connected with the telescopic device for cooperating with the front wheel in order to form a three-point supporting situation.

Other objectives, advantages, and novel features of the invention will become more apparent from the following detailed description when taken in conjunction with the attached drawings.

BRIEF DESCRIPTION OF DRAWINGS

The present invention will be described through detailed illustration of the preferred embodiment referring to the attached drawings.

DETAILED DESCRIPTION OF PREFERRED EMBODIMENT

Figure 1:
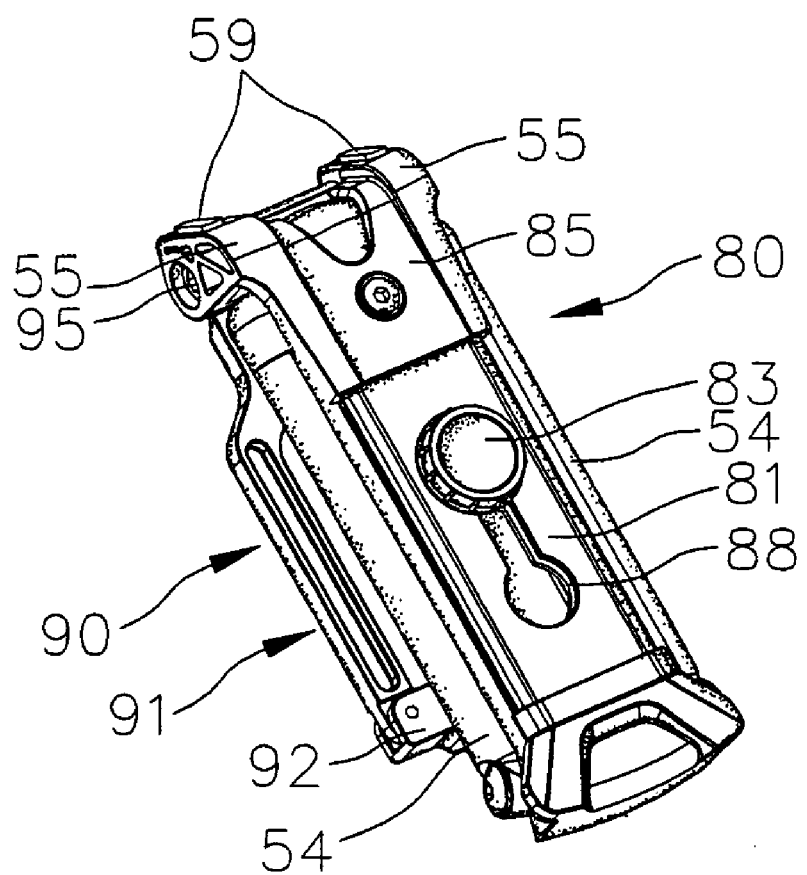
FIG. 1 is a perspective view of a collapsible stand for a bicycle according to the preferred embodiment of the present invention.

FIG. 1 shows a collapsible stand according to the preferred embodiment of the present invention in a collapsed mode.

Figure 2:
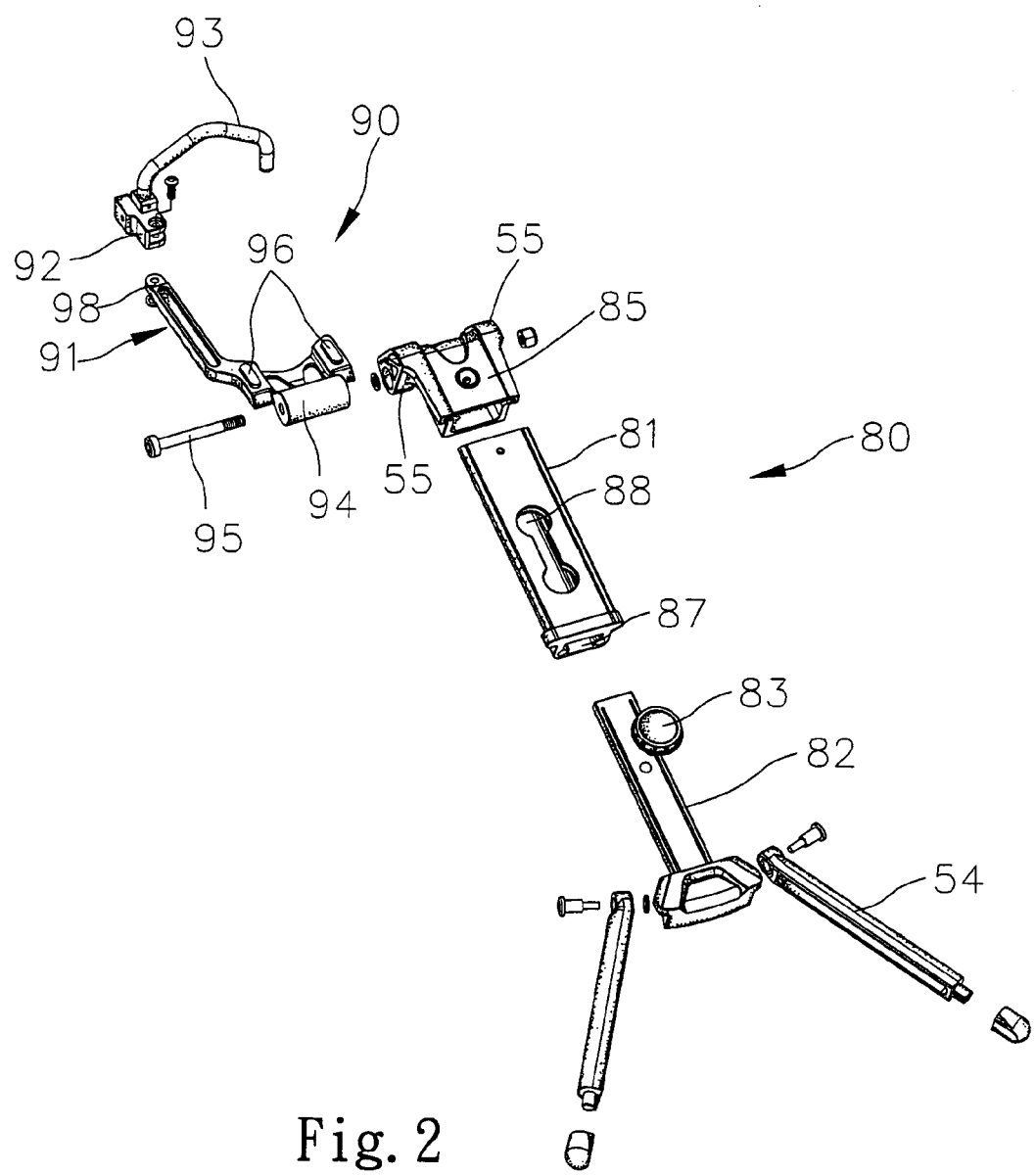
FIG. 2 is an exploded view of the collapsible stand of FIG. 1.

Referring to FIG. 2, the collapsible stand includes a propping and supporting element or device 80 and a holding device 90 pivotally connected with the propping device 80. The propping device 80 is in the form of a longish support member having first and second ends. The propping device 80 includes a telescopic device (not numbered) consisting of a tube 81 and a rod 82 inserted in the tube 81. The tube 81 defines a space 87 and a slot 88 communicated with the space 87. The rod 82 is movably inserted in the space 87. A knob 83 is secured to an end of a screw (not shown). An opposite end of the screw is driven into a screw hole (not numbered) defined in the rod 82 through the slot 88.

Ends of first and second legs 54 are pivotally connected about leg pivot axes with the rod 82 at the first end of the propping device 80. The propping device 80 is located intermediate the first and second legs 54. The first and second legs 54 are pivotal between a collapsed position generally parallel to each other and to the propping device 80 and a fully extended position extending at a nonparallel angle to each other and to the propping device 80. The leg pivot axes are located in a plane.

A lower palming element 85 is secured to the tube 81. The lower palming element 85 includes two ears 55 formed thereon and at the second end of the propping device 80. A pad 59 (FIGS. 1 and 3) is attached to each of the ears 55.

The holding device 90 includes an upper palming element 91 pivotally connected about a device pivot axis parallel to the plane of the leg pivot axes, with the lower palming element 85 being at the second end of the propping device 80. Thus, the holding device 90 is collapsible with the dropping device 80. The holding device 90 further includes a hooking element 93 pivotally connected about a hook pivot axis with the upper palming element 91, with the hook pivot axis being perpendicular to the device pivot axis and to the propping device 80. The upper palming element 91 includes an ear 94 formed at an end and an ear 98 formed at an opposite end. The ear 94 is located between the ears 55. A bolt 95 is driven into the ears 94 and 55 in order to pivotally connect the upper palming element 91 with the lower palming element 85. Two pads 96 are attached to the upper palming element 91. The hooking element 93 includes two cars 92 formed at an end. A screw (not numbered) is driven into the ears 92 and 98 in order to pivotally connect the hooking element 93 with the upper palming element 91.

A spacing between the first and second ends of the propping device 80 is variable, with the device pivot axis being perpendicular to the spacing. The legs 54 have a length from the leg pivot axes generally equal to but slightly less than the spacing to the device pivot axis when the propping device 80 is telescoped together.

Figure 3:
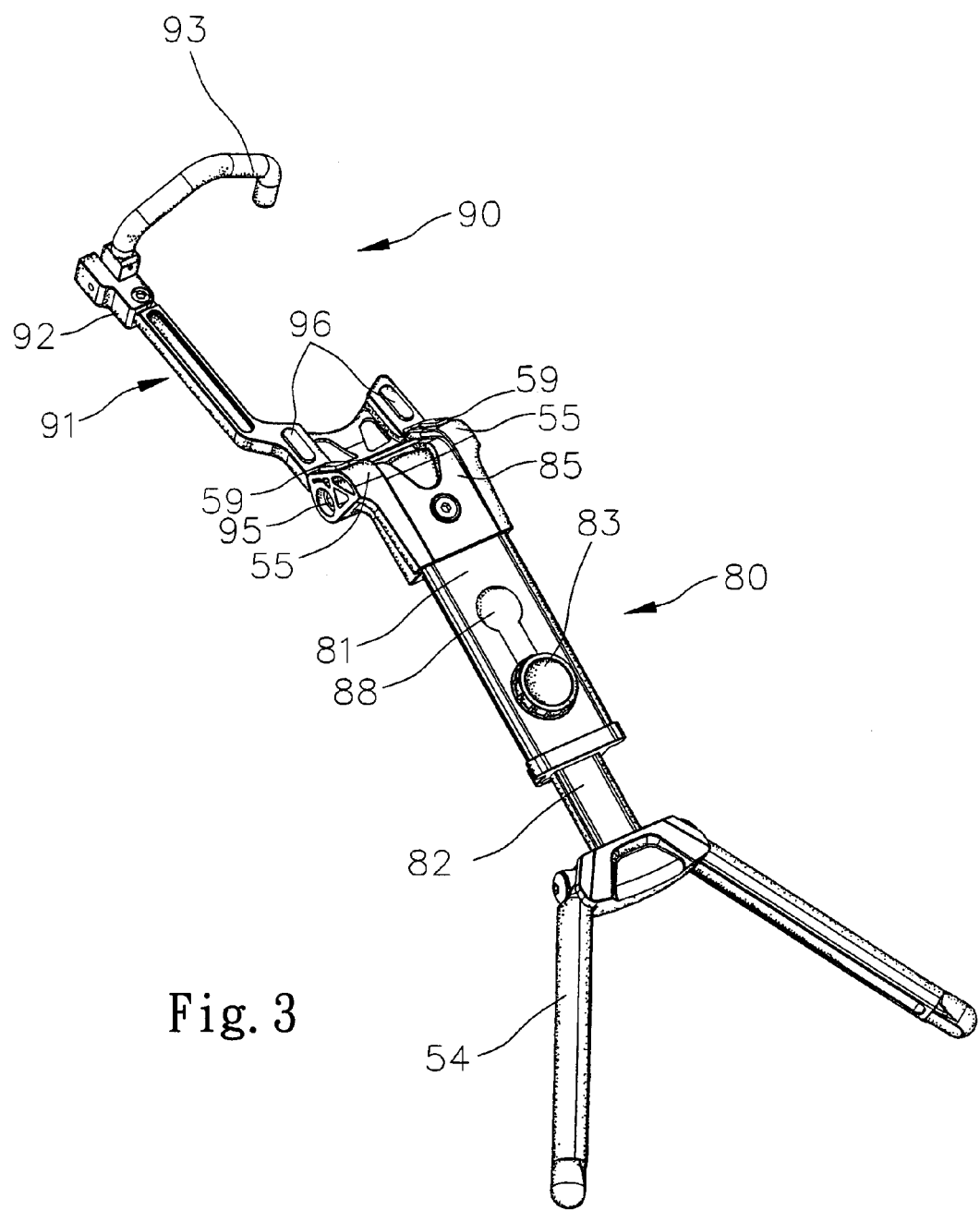
FIG. 3 is similar to FIG. 1 but shows the collapsible stand in a fully extended position.
Figure 4:
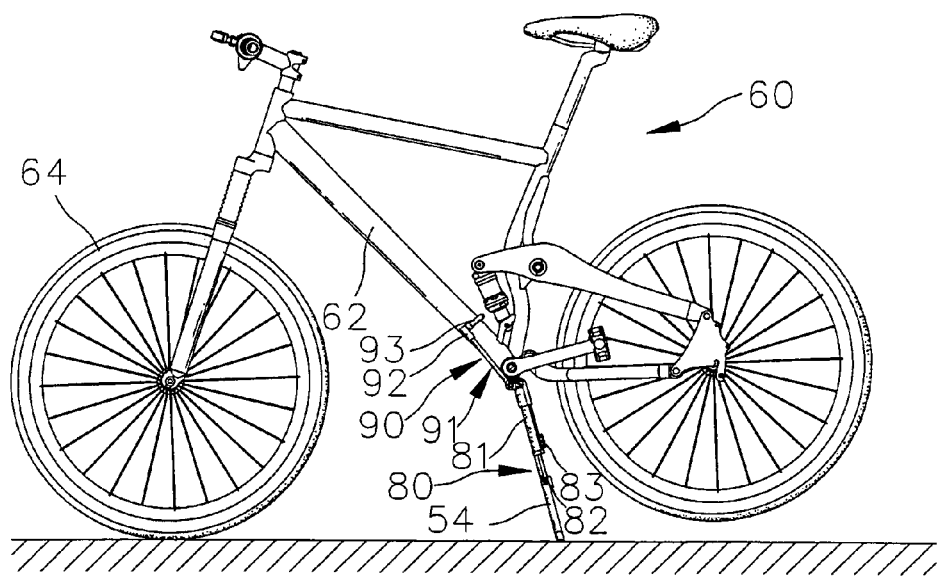
FIG. 4 is a side view of a bicycle supported by the collapsible stand of FIG. 3.
Figure 5:
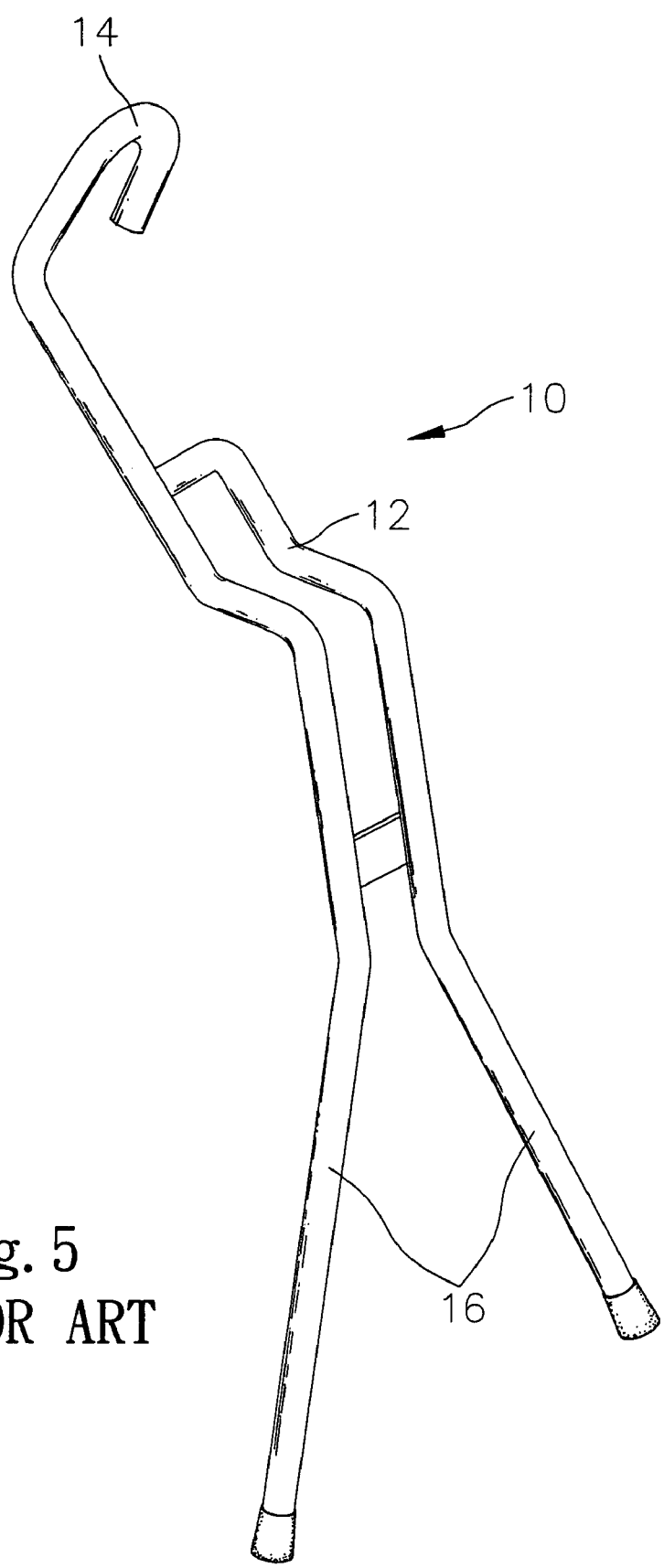
FIG. 5 is a perspective view of a conventional bicycle rack.

Referring to FIG. 3, the stand is in a fully extended position. FIG. 4 shows the fully extended collapsible stand supporting a bicycle 60. The bicycle 60 will not be described in detail for being conventional. A down tube 62 of the bicycle 60 is supported on the pads 59 and 96 of the collapsible stand. A tube of the bicycle 60 that receives a crank axle of the bicycle 60 is hooked by the hooking element 93. A front wheel 64 of the bicycle 60 and the legs 54 form a stable three-point supporting condition. Thus, the bicycle 60 is kept in a stable situation.

The present invention has been described through detailed illustration of the preferred embodiment. Those skilled in the art can derive variation from the preferred embodiment without departing from the scope of the present invention. Therefore, the preferred embodiment shall not limit the scope of the present invention defined in the claims.

The invention claimed is:

1. A collapsible stand for a bicycle, the bicycle including a front wheel, a down tube and a bottom bracket, the collapsible stand including a holding device for holding the bicycle and a supporting element for supporting the bicycle on the ground, wherein the supporting element comprises a longish support member and two legs, said two legs along with the wheel provide a three-point supporting for the bicycle, wherein one end of said two legs, respectively, is pivotally connected with an end of the longish support member so that said legs are collapsible with said longish support member, and wherein the holding device is pivotally connected with the other end of the longish support member so that said holding device is collapsible with said longish support member, wherein the longish support member is a telescopic device, with a spacing being variable between the ends of the longish support member pivotally connected to the two legs and to the holding device.

2. A collapsible stand for a bicycle, the bicycle including a front wheel, a down tube and a bottom bracket, the collapsible stand including a holding device for holding the bicycle and a supporting device pivotally connected with the holding device for supporting the bicycle on the ground, wherein the holding device includes a hooking element for hooking the down tube and a palming element pivotally connected with the hooking element for palming the bottom bracket.

3. The collapsible stand according to claim 2 wherein the supporting device includes a palming element pivotally connected with the palming element of the holding device for palming the bottom bracket, a telescopic device connected with the palming element of the supporting device and two legs pivotally connected with the telescopic device for providing a three-point supporting situation together with the front wheel.

4. The collapsible stand according to claim 3 wherein the telescopic device includes a tube and a rod movably inserted in the tube.

5. The collapsible stand according to claim 3 wherein the palming element of the holding device includes an ear formed thereon, wherein the palming element of the supporting device includes two ears pivotally connected with the ear of the palming element of the holding device.

6. The collapsible stand according to claim 3 including at least one pad put on the palming element of the supporting device.

7. The collapsible stand according to claim 2 including a bolt driven into the ears of the palming element of the supporting device and the ear of the palming element of the holding device.

8. The collapsible stand according to claim 2 wherein the hooking element includes two ears, wherein the palming element of the holding device includes an ear pivotally connected with the ears of the hooking element.

9. The collapsible stand according to claim 2 including at least one pad put on the palming element of the holding device.

10. A collapsible stand for a bicycle, the bicycle including a front wheel, a down tube, and a bottom bracket, the collapsible stand comprising: a propping element having a first end and a second end; first and second legs pivotally connected about leg pivot axes with the first end of the propping element, with the propping element located intermediate the first and second legs, with the first and second legs being pivotal between a collapsed position generally parallel to each other and to the propping element and a fully extended position extending at a nonparallel angle to each other and to the propping element, with the leg pivot axes located in a plane, and a holding device for holding the bicycle, with the holding device pivotally mounted to the second end of the propping element about a device pivot axis parallel to the plane of the leg pivot axes, wherein the propping element is a telescopic device, with a spacing between the first and second ends being variable, with the device pivot axis being perpendicular to the spacing.

11. The collapsible stand according to claim 10 wherein the legs have a length from the leg pivot axes generally equal to but slightly less than the spacing to the device pivot axis when the telescopic device is telescoped together.

12. The collapsible stand according to claim 11 wherein the holding device includes an upper palming element and a hooking element, with the hooking element pivotally mounted to the upper palming element about a hook pivot axis perpendicular to the device pivot axis and to the propping element.

13. The collapsible stand according to claim 12 wherein the telescopic device includes a tube; a rod slideably received in the tube, with the tube including a slot; and a knob extending through the slot and secured to the rod.

14. The collapsible stand according to claim 13 wherein the propping element includes a lower palming element, with the upper palming element pivotably connected to the lower palming element about the device pivot axis.

15. The collapsible stand according to claim 12 wherein the propping element includes a lower palming element, with the upper palming element pivotably connected to the lower palming element about the device pivot axis.

16. The collapsible stand according to claim 10 wherein the telescopic device includes a tube; a rod slideably received in the tube, with the tube including a slot; and a knob extending through the slot and secured to the rod.

17. The collapsible stand according to claim 10 wherein the holding device includes an upper palming element and a hooking element, with the hooking element pivotally mounted to the upper palming element about a hook pivot axis perpendicular to the device pivot axis and to the propping element.

18. The collapsible stand according to claim 17 wherein the propping element includes a lower palming element, with the upper palming element pivotably connected to the lower palming element about the device pivot axis.

* * * * *